Jan. 3, 1950 E. TOTH 2,493,045

FULL-WAVE NOISE-PEAK AND OUTPUT LIMITER

Filed Sept. 23, 1947

Inventor
EMERICK TOTH

By M. C. Hayes

Attorney

Patented Jan. 3, 1950

2,493,045

UNITED STATES PATENT OFFICE 2,493,045

FULL-WAVE NOISE-PEAK AND OUTPUT LIMITER

Emerick Toth, Takoma Park, Md.

Application September 23, 1947, Serial No. 775,601

5 Claims. (Cl. 250—20)

(Granted under the act of March 3, 1883, as amended April 30, 1928; 370 O. G. 757)

This invention relates generally to noise limiting circuits for radio communication systems and the like, and more particularly to a full-wave series limiting circuit which will limit both positive and negative signal peaks and requires a minimum of component parts.

Many types of limiter circuits are known in the prior art, the most popular probably being the series type half-wave limiter. Other circuits have been developed which provide more complete limiting but these circuits require such a multiplicity of additional components they are not considered practical from the standpoint of economy of space and material.

It is therefore an object of this invention to provide a simple full-wave limiting circuit requiring a minimum of component parts.

It is another object of this invention to provide an output limiting circuit which will limit both positive and negative noise peaks with a minimum of component parts.

It is another object of this invention to provide a simple full-wave limiting circuit whose limits are automatically determined in accordance with the average value of the received signals.

It is another object of this invention to provide a simple noise limiter circuit which is particularly effective in the reception of CW signals.

Figure 1:
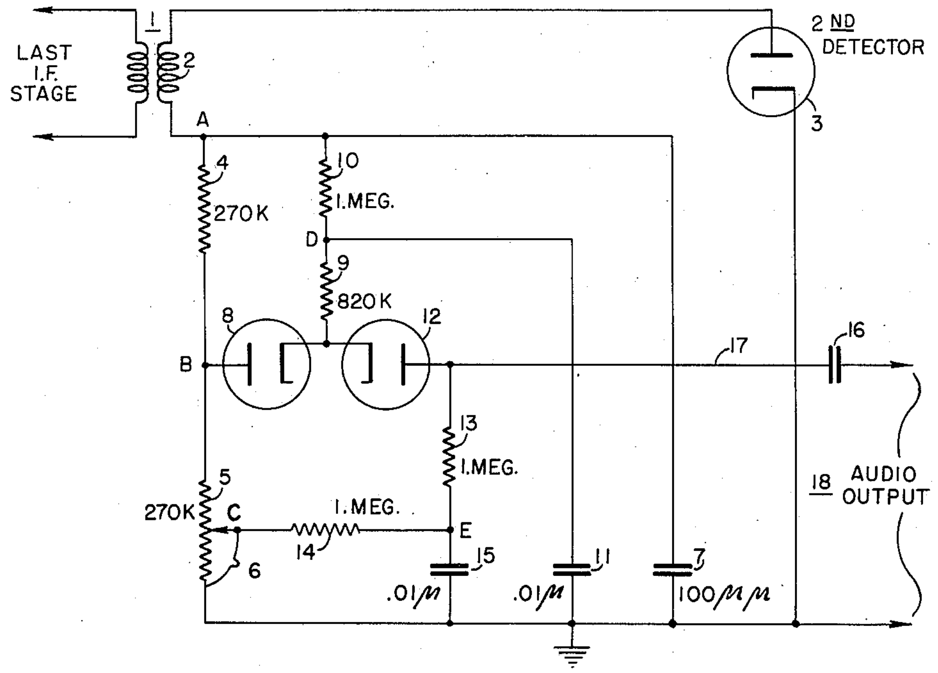
Figure 2:
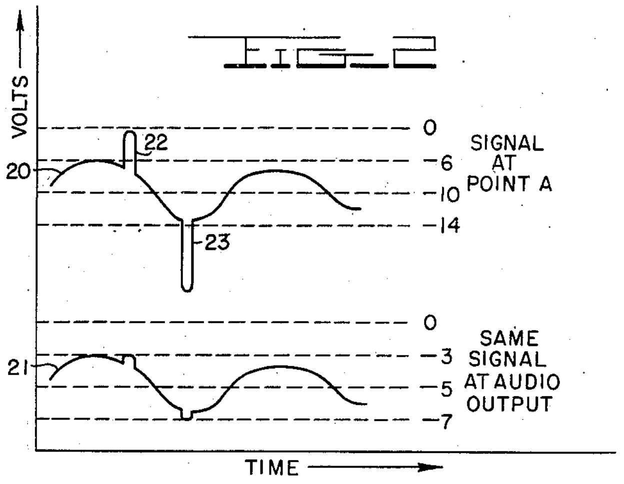

Other objects and advantages of the invention will be apparent from the following description and accompanying drawing, wherein:

Fig. 1 is a schematic diagram of a representative embodiment of this invention; and Fig. 2 shows a pair of waveforms representative of a received signal before and after its application to the limiting circuit of Fig. 1.

Briefly, this invention discloses a demodulation means for a radio receiver wherein the audio output is delivered through a pair of unilateral impedance means connected in series opposition from an intermediate point in a resistive-capacitive circuit. Such diodes are biased respectively at the desired upper and lower limits of the audio output potential so that one or the other of said diodes will be non-conducting for signal peaks which exceed said limits. This invention also discloses means for automatically establishing the bias for said diodes in accordance with the average magnitude of the received signal.

Referring now to Fig. 1 in detail, the invention is shown as embodied in a superheterodyne receiver, wherein transformer 1 represents the output transformer of the last I. F. stage of the receiver and diode vacuum tube 3 the second detector. The detector circuit is completed through the series resistors designated 4 and 5 in parallel with a condenser 7, said resistors and condenser linking the lower end (designated point A in the drawing) of the transformer secondary 2 to the cathode of the detector diode 3. It will be noted that the cathode of said second detector is tried to ground, therefore the detected signal appearing at point A across the series resistors 4 and 5 will be negative with respect to ground. The resistance designated as 6 is the resistance between the sliding tap on resistance 5 and ground.

The junction of series resistors 4 and 5 (designated point B) is connected to the plate of a first noise limiting diode 8, whose cathode is linked to point A through two series resistors 9 and 10. The junction of series resistors 9 and 10 (designated point D) is bypassed to ground through a condenser 11. The cathode of said first noise limiting diode 8 is connected to the cathode of a second noise limiting diode 12, whose plate is linked to the sliding tap of series resistance 5 (designated point C) through another pair of series resistors 13 and 14. The midpoint (designated point E) of series resistors 13 and 14 is bypassed to ground through a condenser 15.

In a specific arrangement resistor 5 is made substantially equal to resistor 4 and resistor 6 is made substantially equal to ½ resistor 4 or 5. As illustrated by the parameters indicated on the drawing, the respective resistance of each of the other resistors, 9, 10, 13 and 14 is large with respect to that of the first named resistors 4, 5 and 6. Similarly, the capacitance of condensers 11 and 15 is large with respect to that of the first named condenser 7.

It will be seen from the drawing that upon reception of an incoming signal, an average negative voltage is developed at point A, and is applied directly to the cathodes of diodes 8 and 12 through resistors 9 and 10 making said cathodes more negative than their respective plates, since the potential of their plates is governed respectively by their connection to points B and C on the voltage divider 4 and 5. Thus under normal signal conditions having no noise peaks, both diodes are conducting. Assuming an average voltage of −10 from point A to ground, the current path from point A to ground will include: (1) resistances 4 and 5; (2) resistances 10, 9 and 5 and diode 8; and (3) resistances 10, 9, 13, 14 and 6, and diode 12. With the voltage at point A constant, both limiting diodes 8 and 12 are conducting and the audio output path, comprising lead 17 and condenser 16 is complete. The voltage at the other points in the circuit will then be of the order of −5 at B, −2½ at C, −7 at D, and −3 at E. If point D were held at −7 volts and point E were held at −3 volts, signals varying point B between −7 and −3 volts would be passed by the diodes to the audio output. For example, suppose an audio signal changes the potential of point B to −6 volts: At −6 volts the plate of diode 8 is more positive than the substantially −7 volts at its cathode as governed by point D, thus diode 8 will conduct and its cathode will drop to about −6 volts. The −6 volts signal will therefore appear on the cathode of diode 12, making it more negative than the −3 volts applied to its plate from point E. Therefore both diodes 8 and 12 are conducting and the voltage change at point B will be transmitted to the audio output 18.

In actual operation, variations in the average voltage at point D are dependent substantially upon the RC time constant of resistance 10 and condenser 11 and variations in the average voltage at point E are dependent substantially upon the RC time constant of resistance 14 and condenser 15. For the parameters indicated in the drawing the above time constants would be of the order of .01 second, a relatively slow time constant at audio frequencies. However point A is stabilized by a time constant of the order of 50 microseconds as primarily determined by resistors 4 and 5 and condenser 7. Therefore it will be seen that point A, and hence point B, can easily follow an audio signal whereas points D and E will tend to remain at a voltage determined by the average value of the voltage at point A. Thus the points D and E may be considered constant and the operation of the circuit is as described in the above example.

The above example illustrates the operation of the circuit in passing audio fluctuations in the potential of point B between the limits set up by the potentials of points D and E. Variations of point B to potentials outside said limits would not be passed to the audio output. This is the noise or output limiting feature of the invention and may be more easily understood from the following examples:

Suppose the average voltage at point A is −10 and the other voltages as previously described, then if a noise signal of 100 volts is received, point A will follow the noise signal to a −100 volt level but points D and E will not immediately change in voltage. As a result point B becomes −50 volts with respect to ground and the plate of diode 8 becomes 43 volts more negative than its cathode, consequently the diode 8 stops conducting and disconnects the audio output 18 until point D can charge up to the potential of point B. The noise pulse will usually have decayed before point D returns diode 8 to conduction. The −100 volt noise signal will appear only as a −7 volt signal at the audio output.

If the voltage at point A were suddenly reduced from its average of −10 to −3 volts, as by a negative noise potential, the potential at point B would drop to −1½ volts. −1½ being more positive than the −7 volts at point D, diode 8 would conduct and the −1½ volt potential of point B would be applied to the cathode of diode 12. However, the plate of diode 12 is then more negative than its cathode due to the −3 volts at point E and diode 12 would not conduct. Thus the audio output 18 is again cut off from point B.

The permitted signal range of −3 to −7 volts used in the above examples is dependent upon a −10 volt average signal at point A, said signal range will automatically adjust itself about the center of any other average voltages which may be encountered. In practice said average voltage is adjusted to a suitable operating level by controlling the R. F. or I. F. gain. This circuit is particularly advantageous over the prior art in the reception of CW signals wherein the effective modulation percentage at the second detector is inherently low and negative noise signals are passed at a high amplitude by the second detector and are unaffected by the usual half-wave series diode noise limiter.

From the foregoing description, the implication of the waveforms illustrated in Fig. 2 will be obvious. Waveform 20 shows a received amplitude modulated signal as it would appear at point A. This signal has superimposed thereon a positive appearing noise peak 22 and a negative appearing noise peak 23. The waveform 21 shows the same signal as it would appear at the audio output. It will be noted that both positive and negative noise peaks have been clipped without distorting the original signal. Dotted horizontal lines indicate the voltage amplitude thus showing where the limiting action occurs with respect to the signal voltage.

Although a specific embodiment of this invention has been herein disclosed and described, it is to be understood that it is merely illustrative of this invention and modifications may, of course, be made without departing from the spirit and scope of the invention as defined in the appended claims.

The invention described herein may be manufactured and used by or for the Government of the United States of America for governmental purposes without the payment of any royalties thereon or therefor.

What is claimed is:

1. In a radio receiver including a demodulator operative to develop both a direct current output proportional to the received signal intensity and a detected output signal; the combination of output means, means coupling the detected output of said demodulator to said output means comprising a pair of unilateral electron discharge devices connected in series opposition, and means differently biasing said discharge devices from the direct current output of said demodulator whereby both said devices are normally maintained conductive, but one or the other becoming non conductive in response to detected signals from said demodulator exceeding a predetermined amplitude.

2. In a radio receiver having a demodulator and a resistance-capacitance charging circuit across which the output from said demodulator is derived; the combination of, first and second diode means connected in series opposition, an audio output terminal connected through said series diode means to an intermediate point in said resistance-capacitance circuit, first and second biasing means respectively biasing said series diode means at their junction point and at the terminal adjacent the said audio output terminal to different proportions of the average voltage appearing across said resistance-capacitance circuit.

3. In a radio receiver having a demodulator and a resistance-capacitance charging circuit across which the output from said demodulator is derived, said charging circuit having a small time constant at audio frequencies; the combination of, first and second diode means connected in series opposition, an audio output terminal connected through said series diode means to an intermediate point in said charging circuit, first and second biasing means having large time constants at audio frequencies, said biasing means respectivly biasing said series diode means at their junction point and at the terminal adjacent the said audio output terminal to different proportions of the average voltage appearing across said charging circuit.

4. In a radio receiver having a demodulator and a resistance-capacitance charging circuit across which the output from said demodulator is derived, said charging circuit having a small time constant at audio frequencies; the combination of, first and second diode means connected in series opposition, an audio output terminal connected through said series diode means to an intermediate point in said charging circuit, first and second resistance-capacitance biasing means connected to selected points in said charging circuit and having large time constants at audio frequencies, said biasing means respectively biasing said series diode means at their junction point and at the terminal adjacent the said audio output terminal to different proportions of the average voltage appearing across said charging circuit.

5. In a radio receiver having a demodulator and a resistance-capacitance charging circuit across which the output from said demodulator is derived, said charging circuit having a small time constant at audio frequencies; the combination of, first and second diode means connected in series opposition, an audio output terminal connected through said series diode means to an intermediate point in said charging circuit, first and second resistance-capacitance biasing means connected to selected points in said charging circuit and having large time constants at audio frequencies, said biasing means respectively biasing said series diodes at their junction point to a level near the average voltage at one end of said charging circuit and at the diode terminal adjacent said audio output terminal to a level near the average voltage at the other end of said charging circuit.

EMERICK TOTH.

REFERENCES CITED

The following references are of record in the file of this patent:

UNITED STATES PATENTS

| Number | Name | Date |
|---|---|---|
| 2,279,819 | Fyler | Apr. 14, 1942 |
| 2,324,275 | Becker | July 13, 1943 |
| 2,338,412 | Dallos | Jan. 4, 1944 |